United States Patent [19]

Da Re'

[11] Patent Number: 4,968,461

[45] Date of Patent: Nov. 6, 1990

[54] METHOD FOR THE PRODUCTION OF UNSATURATED POLYESTER RESIN BASED ARTICLES BY MOULDING

[75] Inventor: Mario Da Re', Turin, Italy

[73] Assignee: Fiat Auto S.p.A., Turin, Italy

[21] Appl. No.: 370,062

[22] Filed: Jun. 16, 1989

Related U.S. Application Data

[63] Continuation-in-part of Ser. No. 133,828, Dec. 16, 1987, abandoned.

[30] Foreign Application Priority Data

Dec. 16, 1986 [IT] Italy ............................... 67935 A/86

[51] Int. Cl.$^5$ ............................................. B29C 35/12
[52] U.S. Cl. .................................. 264/26; 264/211.23; 264/211.24; 264/320; 264/349; 425/174.8 R; 425/204
[58] Field of Search ..................... 264/25, 26, 140–144, 264/320, 349, 211.21–211.24; 425/204–209, 174.8 R, 174.8 E

[56] References Cited

U.S. PATENT DOCUMENTS

| | | | |
|---|---|---|---|
| 3,477,101 | 11/1969 | Fritsch ................... | 425/325 |
| 4,001,368 | 1/1977 | Michizoe et al. ........ | 264/349 |
| 4,147,488 | 4/1979 | Chiron ..................... | 264/26 |
| 4,191,718 | 3/1980 | Mallick et al. ........... | 264/26 |
| 4,423,191 | 12/1983 | Haven et al. ............. | 264/26 |
| 4,459,249 | 7/1984 | Matsuda .................. | 264/45.3 |
| 4,478,771 | 10/1984 | Schreiber ................. | 264/25 |
| 4,546,226 | 10/1985 | Trembley et al. ........ | 425/174.8 E |
| 4,555,373 | 11/1985 | Bloemkolk et al. ..... | 264/25 |
| 4,647,418 | 3/1987 | McDougal ............... | 264/349 |
| 4,737,407 | 4/1988 | Wycech ................... | 264/26 |

FOREIGN PATENT DOCUMENTS

| | | | |
|---|---|---|---|
| 136235 | 6/1979 | German Democratic Rep. ... | 264/22 |
| 56-37895 | 9/1981 | Japan ................................. | 425/204 |

*Primary Examiner*—Jeffery Thurlow
*Attorney, Agent, or Firm*—Sughrue, Mion, Zinn, Macpeak & Seas

[57] ABSTRACT

An unsaturated-polyester-resin-based mass to be moulded, obtained from a pulsating screw mixer, is compressed into brick-shaped compacted articles of suitable dimensions and then subjected to a radio frequency to bring it to a high temperature and render it suitable for immediate compression moulding.

4 Claims, No Drawings

METHOD FOR THE PRODUCTION OF UNSATURATED POLYESTER RESIN BASED ARTICLES BY MOULDING

This is a continuation-in-part of application Ser. No. 07/133,828, filed 12/16/87, now abandoned.

FIELD OF THE INVENTION

The present invention relates to a method for the production of unsaturated-polyester-resin-based articles by moulding.

BACKGROUND OF THE INVENTION

The compression moulding of unsaturated polyesters, specifically SMC (sheet moulding compound) or BMC (bulk moulding compound), has assumed a growing importance in the motor vehicle industry, where they are used for the manufacture of functional and structural parts of motor vehicles, with particular reference to the bodywork.

The more widespread use of unsaturated polyester resins, however, is limited by the high costs of preparing and transforming the moulding masses currently available and by problems relating to the qualitative appearance of the articles made from them.

In order to achieve the desired thickening of the resin, the production of masses of unsaturated polyester resin for moulding in fact requires a period of maturation which must generally precede the moulding by at least 24 hours, whereby it is impossible to carry out the preparation of the moulding mass and the moulding itself on a production line. Moreover, the moulding masses, such as SMC, require very long transformation periods in the closed mould, of the order of 35–45 seconds per millimetre of thickness, with a consequent limitation on productivity.

Furthermore, the products made by the moulding of SMC and/or BMC often give rise to defects which necessitate finishing operations after moulding (blowing) and recovery after painting.

SUMMARY OF THE INVENTION

In order to avoid these disadvantages, the present invention provides a continuous method for the production of unsaturated-polyester-resin-based articles by moulding, characterised in that it includes, in succession without substantial lapse of time between steps, the steps of:

Kneading a composition of the polyester resin to be moulded in a continuous pulsating screw kneader until a product suitable for subsequent working is obtained;

compacting the paste by mechanical pressure to obtain pre-compressed shapes;

heating the pre-compressed shapes by means of high frequencies to a temperature as close as possible to that of polymerization, and feeding the pre-compressed shapes immediately into the mould for compression moulding.

Preferably, the continuous method according to the present invention for the production of unsaturated-polyester-resin-based articles by moulding comprises, in succession without substantial lapse of time between steps, the steps of:

kneading a composition of the polyester resin to be moulded in a continuous pulsating screw kneader at a temperature of from 30–60° C. until a useable paste is obtained, the composition comprising an unsaturated polyester resin, glass fibers and at least one filler selected from the group consisting of calcium carbonate, aluminum hydrate, iron oxides and mixtures thereof;

directly compacting the paste exiting from the kneader by mechanical pressure to obtain pre-compressed shapes;

heating the pre-compressed shapes by application of high frequencies for a period of 1–5 seconds until the precompressed shapes reach a temperature close to the moulding temperature in the following step; and feeding the pre-compressed shapes immediately into the mould for compression moulding.

In accordance with the method of the present invention discussed above, the pre-compressed shapes are substantially free of air inclusions.

Thus, the present invention relates to a continuous on-line process starting from raw materials. In accordance with the steps described above, substantial advantages are obtained with respect to the compression moulded article. An important aspect of the process is that the particular steps are carried out sequentially without allowing any substantial aging time of the composition to be moulded.

DETAILED DESCRIPTION OF THE INVENTION

The moulding composition used in the method of the invention includes, in addition to the unsaturated polyester resin, catalysts, inhibitors, accelerants and fillers in accordance with the conventional technology. The term fillers is understood to include thickening and reinforcing agents such as calcium carbonate, aluminum hydroxide, mica, kaolin, long and/or short glass fibres, etc.

The formulation of the fillers is selected so as to facilitate the rapid thickening of the moulding mass and increase its capacity to absorb high frequencies.

The composition of the moulding mass may also include thermoplastic resins to give specific properties to the moulding mass. One is referring to polyvinyl fluorides, polyolefins, polyesters, polyurethanes, etc.

The composition to be moulded is kneaded in a pulsating screw kneader of the KO-KNETER BUSS type at a temperature in the range 30–60° C. until a usable paste is obtained.

The paste obtained is then directly compacted into pre-compressed shapes (for example, brick-shaped compacted articles having a weight of about 500 g) by the application of mechanical pressure. Such direct compacting is done immediately as the paste exits from the kneader. This treatment enables and is necessary to achieve the elimination of any air inclusions which would have a harmful effect on the reaction to the high frequency.

Immediately after the compaction, the pre-compressed shapes are heated in a high-frequency oven. For this operation, use may be made, for example, of a radio-frequency oven operating at a frequency of the order of 27 megahertz so as to heat the mass to a temperature close to the moulding temperature over a time of the order of 1-5 seconds. During this phase, it is desirable to bring the pre-compressed shapes to a temperature of the order of 80° C - 130° C. Temperatures other than these may be the subject of evaluation.

The compression moulding is then carried out immediately after the heating step, at the usual moulding temperature for SMC, without allowing substantial lowering of the temperature reached by the pre-compressed shape.

The articles obtained by the process described have improved qualitative characteristics, both in terms of superficial appearance and from a structural point of view, by virtue of more complete and homogeneous polymerization.

I claim:

1. A continuous method for the production of unsaturated polyester-resin-based articles by moulding comprising, in succession without substantial lapse of time between steps, the steps of:

kneading a composition of the polyester resin to be moulded in a continuous pulsating screw kneader at a temperature of from 30 to 60° C. until a usable paste is obtained, said composition comprising an unsaturated polyester resin, glass fibers and at least one filler selected from the group consisting of calcium carbonate, aluminum hydrate, iron oxides and mixtures thereof;

directly compacting the paste exiting from the kneader by mechanical pressure to obtain pre-compressed shapes;

heating the pre-compressed shapes by application of high frequencies for a period of 1–5 seconds until the pre-compressed shapes reach a temperature close to a desired moulding temperature in the following step; and feeding the pre-compressed shapes immediately into the mould for compression moulding.

2. A method according to claim 1, wherein said pre-compressed shapes are substantially free of air inclusions.

3. A method according to claim 1, wherein said heating is conducted in a high radio-frequency oven, and the pre-compressed shapes reach a temperature on the order of 80° C.–130° C.

4. A method according to claim 1, wherein during compression moulding, the temperature of the pre-compressed shapes is not substantially lowered.

* * * * *